US008462414B2

United States Patent
Fiess et al.

(10) Patent No.: US 8,462,414 B2
(45) Date of Patent: Jun. 11, 2013

(54) MICROMECHANICAL COMPONENT, LIGHT-DEFLECTING DEVICE, AND MANUFACTURING METHODS FOR A MICROMECHANICAL COMPONENT AND A LIGHT-DEFLECTING DEVICE

(75) Inventors: Reinhold Fiess, Durbach (DE); Joerg Muchow, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 371 days.

(21) Appl. No.: 12/804,490

(22) Filed: Jul. 21, 2010

(65) Prior Publication Data

US 2011/0032591 A1    Feb. 10, 2011

(30) Foreign Application Priority Data

Aug. 7, 2009    (DE) .......................... 10 2009 028 356

(51) Int. Cl.
*G02B 26/08*    (2006.01)
(52) U.S. Cl.
USPC .......................... 359/224.1; 359/291; 359/904
(58) Field of Classification Search
USPC .......... 359/198.1–199.4, 200.6–200.8, 202.1, 359/221.2, 223.1–225.1, 226.2, 904, 290–295, 838, 846, 871, 872; 250/204, 559.06, 559.29, 250/230, 234; 347/255–260; 353/39, 98–99; 385/15–18, 22; 398/12, 19, 45
See application file for complete search history.

(56) References Cited

U.S. PATENT DOCUMENTS

| 6,595,055 B1 * | 7/2003 | Schenk et al. ............. 73/514.15 |
| 2004/0056742 A1 * | 3/2004 | Dabbaj ........................... 335/78 |

FOREIGN PATENT DOCUMENTS

DE    199 61 572    7/2001

* cited by examiner

*Primary Examiner* — Jennifer L. Doak
(74) *Attorney, Agent, or Firm* — Kenyon & Kenyon LLP

(57) ABSTRACT

A micromechanical component includes: a mirror element with a reflective surface on a first outer side of the mirror element, which is designed in such a way that a first potential is applied to a first electrode surface on a second outer side of the mirror element opposite from the first outer side; a counterelectrode situated adjacent to the second outer side of the mirror element and which is designed in such a way that a second potential is applied to a second electrode surface of the counterelectrode; and a voltage control unit configured to apply a temporally varying voltage signal between the first electrode surface and the second electrode surface.

12 Claims, 4 Drawing Sheets

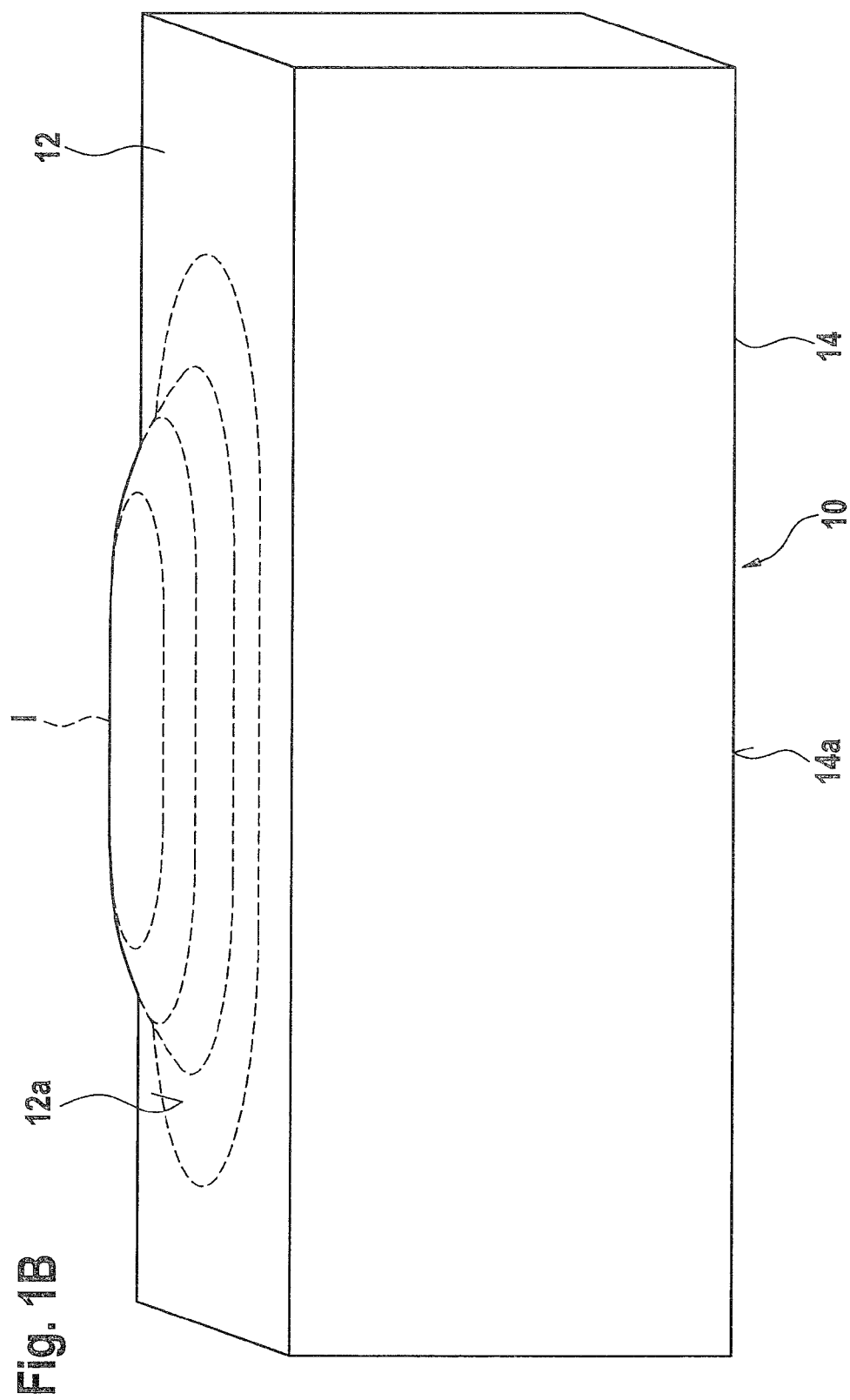

MICROMECHANICAL COMPONENT, LIGHT-DEFLECTING DEVICE, AND MANUFACTURING METHODS FOR A MICROMECHANICAL COMPONENT AND A LIGHT-DEFLECTING DEVICE

BACKGROUND OF THE INVENTION

1. Field of the Invention

The present invention relates to a micromechanical component, e.g., for a light-deflecting device, and to manufacturing methods for a micromechanical component and a light-deflecting device.

2. Description of Related Art

A light-deflecting device such as a projector or a display unit, for example, generally includes at least one mirror which may be displaced about at least one rotational axis. By displacing the mirror about the at least one rotational axis with the aid of an actuator or motor designed for this purpose, a light beam may be deflected onto a projection surface in such a way that an image is projected onto the projection surface. This type of light-deflecting device is described in published German patent document DE 199 61 572 C2, for example.

BRIEF SUMMARY OF THE INVENTION

The present invention is based on the recognition that undesired intensity maxima and/or intensity minima (speckle) in an image projected using a laser, for example, may be avoided by ensuring that no temporally constant phase difference is present between the spherical waves emanating from the individual points of a mirror surface. A temporally varying phase difference between the spherical waves emanating from the mirror surface may be achieved by disturbing the coherence of the light beam which is deflected on the mirror surface.

This may be easily carried out by setting the mirror surface itself in motion and/or by deflecting the light beam which is deflected on the mirror surface on a moving reflective surface before and/or after striking the mirror surface. This may be easily carried out using the micromechanical component or the light-deflecting device described herein. The present invention also allows simple and cost-effective manufacture of a suitable micromechanical component or of the light-deflecting device.

In one advantageous example embodiment, the mirror element may be displaced with respect to the counterelectrode, in a direction perpendicular to the reflective surface, by the temporally varying voltage signal which is applied between the first electrode surface and the second electrode surface. Because the mirror element may be displaced perpendicularly to the reflective surface, the desired displacement motion of the mirror element hardly results in a change in an angle of reflection by which the coherent light beam is deflected by the mirror element. Modulation of the phase of a coherent light beam striking the reflective surface of the mirror element may thus be easily and reliably carried out with the aid of the micromechanical component.

In particular, the mirror element may be set in resonant oscillating motion with respect to the counterelectrode by the temporally varying voltage signal which is applied between the first electrode surface and the second electrode surface. Reliable operation of the micromechanical component may thus be ensured, with low power consumption.

In another example embodiment, the mirror element is a plate electrode provided with polish and/or a reflective coating as a reflective surface on the first outer side. A "plate electrode" is understood to mean a form of the mirror element in which a maximum thickness of the mirror element is less than a maximum extension of the first outer side and/or of the second outer side. The mirror element designed as a plate electrode may be easily manufactured.

The mirror element is preferably connected to a support via at least one diaphragm which at least partially surrounds the mirror element. In this case the mirror element may be displaced over a desired displacement range with the aid of the applied voltage signal. The reflective surface may preferably be set in resonant oscillation. In addition, a preferred natural frequency of the oscillating motion of the mirror element may be specified via a maximum thickness and a span width of the at least one diaphragm.

Furthermore, the counterelectrode may be bonded to the support in such a way that the second electrode surface is situated opposite from the first electrode surface. The second electrode surface is preferably situated at a comparatively small distance, for example between 0.5 m and 5 μm, from the first electrode surface. In this case, a comparatively low applied voltage brings about the desired displacement motion of the mirror element with respect to the counterelectrode and/or the support.

The voltage control unit is preferably designed in such a way that an alternating voltage having a frequency in a range between 100 kHz and 1 GHz may be applied as a temporally varying voltage signal between the first electrode surface and the second electrode surface with the aid of the voltage control unit. An alternating voltage having a frequency in a range between 1 MHz and 100 MHz may preferably be applied. It is thus ensured that the mirror element may be set in the preferred resonant oscillating motion.

The advantages described in the preceding paragraphs are also ensured for a light-deflecting device of this type.

The described advantages are likewise ensured for a corresponding manufacturing method. In particular, producing the mirror element may include the step of providing at least one isolation trench in a semiconductor layer and/or metal layer, the isolation trench being provided in such a way that a mirror element region and a support region which at least partially surrounds the mirror element region are structured from the semiconductor layer and/or metal layer, and the mirror element region is connected to the support region via at least one diaphragm which at least partially surrounds the mirror element region. The structuring of the mirror element from the mirror element region, for example by carrying out an additional oxidation step, may thus be easily performed. In addition, labor-intensive placement of the mirror element in the support is dispensed with. The manufacturing method described herein may thus be carried out quickly and easily.

In one example embodiment of the manufacturing method, the isolation trench is etched into the semiconductor layer and/or metal layer. If the semiconductor layer and/or metal layer is made of silicon, the distance between the first electrode surface and the second electrode surface may be easily specified via the oxidation step. The first electrode surface may be recessed/deepened with respect to an identically oriented upper side of the support region via targeted oxidation.

Furthermore, for situating the counterelectrode adjacent to the second outer side of the mirror element, the counterelectrode may be bonded to the support region in such a way that the second electrode surface is situated opposite from the first electrode surface. It is thus easily ensured that a preferred small distance is present between the two electrode surfaces. A particularly advantageous distance between the two electrode surfaces may be achieved by recessing a surface of the mirror element region, which is surrounded by at least one isolation trench, with respect to an identically oriented surface of the support region via oxidation before the counterelectrode is bonded.

The advantages described in the preceding paragraphs are also provided for a corresponding manufacturing method for the light-deflecting device.

BRIEF DESCRIPTION OF THE DRAWINGS

FIGS. 1A and 1B show a schematic illustration and a partial section, respectively, of one example embodiment of the micromechanical component.

DETAILED DESCRIPTION OF THE INVENTION

Figure 1A:
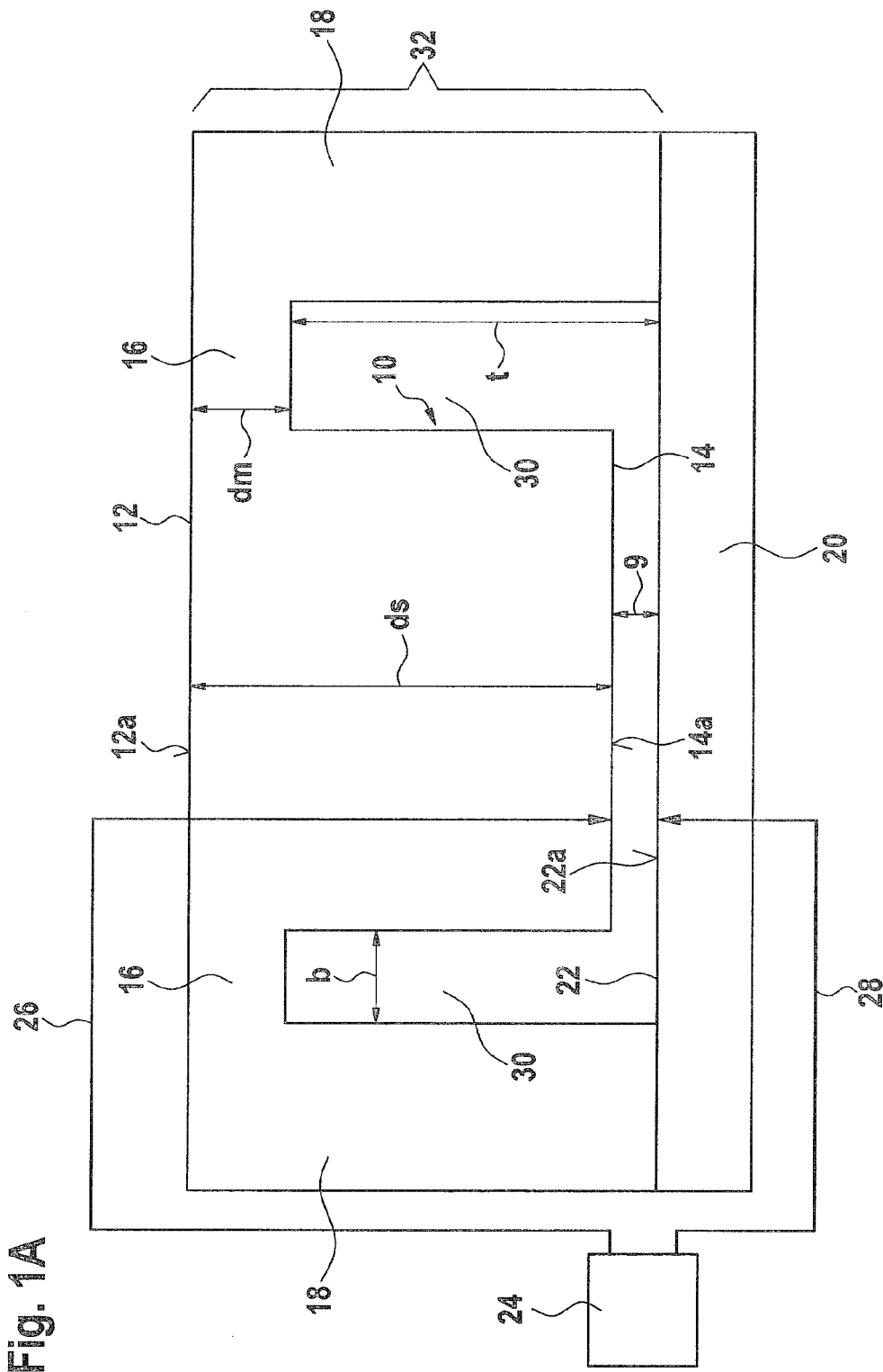

FIGS. 1A and 1B show a schematic illustration and a partial section, respectively, of one example embodiment of the micromechanical component.

The micromechanical component schematically illustrated in FIG. 1A has a mirror element 10 with a first outer side 12 and a second outer side 14 facing opposite from first outer side 12. Mirror element 10 (projection) may have a maximum thickness ds which is less than a maximum extension of first outer side 12 and/or of second outer side 14. Mirror element 10 is preferably shaped in such a way that second outer side 14 is situated opposite from first outer side 12. Mirror element 10 may have a minimum surface area of 0.5 mm² on first outer side 12 and/or on second outer side 14. First outer side 12 and/or second outer side 14 preferably have/has a surface area between 0.5 and 5 mm², in particular between 1 and 2 mm². However, mirror element 10 described here is not limited to a specific shape.

A reflective surface 12a is provided on first outer side 12. Reflective surface 12a preferably covers the entire first outer side 12. For providing reflective surface 12a on first outer side 12, at least one partial surface of first outer side 12 may be polished and/or covered with a reflective coating. Reflective surface 12a is preferably smooth. However, mirror element 10 may also be shaped in such a way that reflective surface 12a has a convex curvature and/or a concave curvature.

A first electrode surface 14a to which a first potential may be applied is provided on second outer side 14. In particular, mirror element 10 may be designed in such a way that the entire second outer side 14 of mirror element 10 may be used as first electrode surface 14a. A first electrode surface 14a which partially or completely covers second outer side 14 may be provided, for example, by producing mirror element 10 completely from a conductive material or by applying a conductive material to mirror element 10.

Mirror element 10 may be designed, for example, as a plate electrode provided with polish and/or a reflective coating as reflective surface 12a on first outer side 12. The plate electrode may have square and/or rounded edges.

For the micromechanical component illustrated, mirror element 10 is connected to a support 18 via at least one diaphragm 16 which at least partially surrounds mirror element 10. The at least one diaphragm 16 preferably contacts mirror element 10 at or near first outer side 12. The at least one diaphragm 16 preferably has a maximum thickness dm perpendicular to reflective surface 12a which is less than maximum thickness ds of mirror element 10 perpendicular to reflective surface 12a. Maximum thickness dm of the at least one diaphragm 16 may, for example, be less than one-half the maximum thickness ds of mirror element 10. In particular, maximum thickness dm of the at least one diaphragm 16 may be less than one-fourth the maximum thickness ds of mirror element 10. Such a maximum thickness dm of the at least one diaphragm 16 ensures in particular that mirror element 10 is displaceable with respect to support 18 only by exertion of a comparatively large force. A relatively high natural frequency of the oscillating motion of mirror element 10 may thus be achieved by bending diaphragm 16.

The shape of a unit composed of mirror element 10 and the at least one diaphragm 16 may also be described in that mirror element 10 protrudes from the at least one diaphragm 16 as a projection-like reinforcement. The projection-like reinforcement is preferably situated in a center of the at least one diaphragm 16. The projection-like reinforcement preferably has a minimum surface area on first outer side 12 which is equal to or greater than a surface area of a light beam, for example a laser beam, to be deflected by mirror element 10.

The illustrated micromechanical component has a counterelectrode 20 which is situated adjacent to second outer side 14 of mirror element 10. Counterelectrode 20 is designed in such a way that a second potential may be applied to a second electrode surface 22a of counterelectrode 20. In the specific embodiment illustrated, counterelectrode 20 is bonded to support 18 in such a way that second electrode surface 22a rests on an inner side 22 of counterelectrode 20 situated opposite from first electrode surface 14a.

A distance g between second outer side 14 and inner side 22, i.e., between first electrode surface 14a and second electrode surface 22a, may be less than 5 μm. In particular, distance g may be less than 2 μm. Distance g is preferably less than 1 μm. The advantages of such a small distance g are described in greater detail below.

The micromechanical component also includes a voltage control unit 24. Voltage control unit 24 is connected to first electrode surface 14a of mirror element 10 via a first contact element 26. Voltage control unit 24 is likewise connected to second electrode surface 22a of counterelectrode 20 via a second contact element 28. First contact element 26 and/or second contact element 28 may include, for example, a conductor, a conductive coating, and/or a conductive trenched layer.

Voltage control unit 24 is designed in such a way that a temporally varying voltage signal may be applied between first electrode surface 14a and second electrode surface 22a via contact elements 26 and 28, respectively. Mirror element 10 may be displaced with respect to counterelectrode 20 or with respect to support 18 as a result of the temporally varying voltage signal which is applied between first electrode surface 14a and second electrode surface 22a. Mirror element 10 is preferably displaced in a direction perpendicular to reflective surface 12a as a result of the temporally varying voltage signal which is applied between first electrode surface 14a and second electrode surface 22a. To set mirror element 10 in oscillating motion, an electrical alternating field/alternating voltage having a frequency in a range between 100 kHz and 1 GHz may be applied as a voltage signal between electrode surfaces 14a and 22a with the aid of voltage control unit 24.

The following expression applies for capacitance C of the capacitor formed from the two electrode surfaces 14a and 22a:

$$C = \varepsilon_0 \cdot \frac{A}{g}, \quad \text{(Equation 1)}$$

where A is the minimum surface area of the two electrode surfaces 14a and 22a.

The force for displacing mirror element 10, resulting from the applied voltage signal, thus results in the following expression:

$$F = \frac{1}{2} \cdot \frac{dC(g)}{dg} \cdot V^2 = -\varepsilon_0 \frac{1}{2} \cdot \frac{A}{g^2} \cdot V^2, \quad \text{(Equation 2)}$$

where V is the applied voltage.

It is apparent from FIG. 1B that mirror element 10, which is displaced with respect to support 18 or counterelectrode 20, is hardly deformed. Mirror element 10 is displaced almost exclusively by bending of the at least one diaphragm 16 (not illustrated in FIG. 1B). Thus, the reflectivity of reflective surface 12a is not impaired by the displacement of mirror element 10, in particular in the region of mirror element 10 (the projection) which a laser spot strikes, schematically represented by an intensity distribution I.

When an image is projected on a projection surface using a customary (laser) projector, undesired intensity maxima and/or intensity minima frequently appear in the projected image. These undesired intensity maxima and/or intensity minima, which usually degrade the optical quality of the projected image, may also be referred to as speckle, speckle patterns, or granulation. The appearance of speckle in the projected image may usually be attributed to interference with the coherent (laser) light due to unevenness of the projection surface, i.e., the mirror surface.

This problem may be avoided with the aid of the micromechanical component. The phase of a coherent light beam, for example a laser beam, which is deflected on reflected surface 12a may be modulated by moving mirror element 10. This may also be described in that the coherence of the light beam which is deflected on the mirror surface is disturbed. The presence of a temporally constant phase difference between the spherical waves emanating from the individual points of the uneven projection surface may be avoided in this way. The appearance of the undesired speckle may thus be avoided by moving mirror element 10.

Mirror element 10 may be set in resonant oscillating motion (natural oscillation) in particular with the aid of the temporally varying voltage signal. The preferred natural oscillation of mirror element 10 may be reliably achieved by applying an electrical alternating field/alternating voltage having a frequency in a range between 1 MHz and 100 MHz as a temporally varying voltage signal between electrode surfaces 14a and 22a, and/or by situating mirror element 10 in a center of the at least one diaphragm 16. For a small distance g less than 2 μm between second outer side 14 and inner side 22, i.e., between the two electrode surfaces 14a and 22a, a voltage signal having a relatively low amplitude ensures a sufficiently large force for the desired displacement of mirror element 10. Mirror element 10 may thus be set in oscillating motion having an amplitude of at least 0.5 μm in a direction perpendicular to first outer side 12 and/or to second outer side 14. Such an amplitude is sufficient to allow a phase shift of up to 180° of a light beam reflected on reflective surface 12a. The appearance of speckle may be reliably avoided in this way.

The resonant frequency of the oscillating motion of mirror element 10 perpendicular to reflective surface 12a with respect to support 18 may be influenced via a span width of the at least one diaphragm 16 from mirror element 10 to support 18, maximum thickness dm of the at least one diaphragm 16, and/or a shape (height and width) of the projection. A preferred range for the resonant frequency may thus be achieved by an appropriate design of the at least one diaphragm 16.

The at least one diaphragm 16 is preferably designed as one piece with support 18 and mirror element 10. The unit composed of the at least one diaphragm 16, support 18, and mirror element 10 may be easily manufactured by providing at least one (non-through) isolation trench 30 in a semiconductor layer and/or metal layer 32. A mirror element region and a support region which at least partially surrounds the mirror element region are preferably structured from semiconductor layer and/or metal layer 32 with the aid of the at least one isolation trench 30. At the same time, the at least one diaphragm 16 is provided in a region between first outer side 12 and a base of the at least one isolation trench 30. Maximum thickness dm of the at least one diaphragm 16 may be established via depth t of the at least one isolation trench 30. A span width of the at least one diaphragm 16 from support 18 to mirror element 10 may also be established via width b of the at least one isolation trench 30. Further design options for manufacturing the micromechanical component are discussed in the description of FIG. 3.

In one refinement, the micromechanical component described in the preceding paragraphs may be provided with an actuator which is designed to displace mirror element 10 and counterelectrode 20 about at least one rotational axis. The micromechanical component may thus also be used for the targeted deflection of a light beam in a direction which varies over time.

Figure 2:
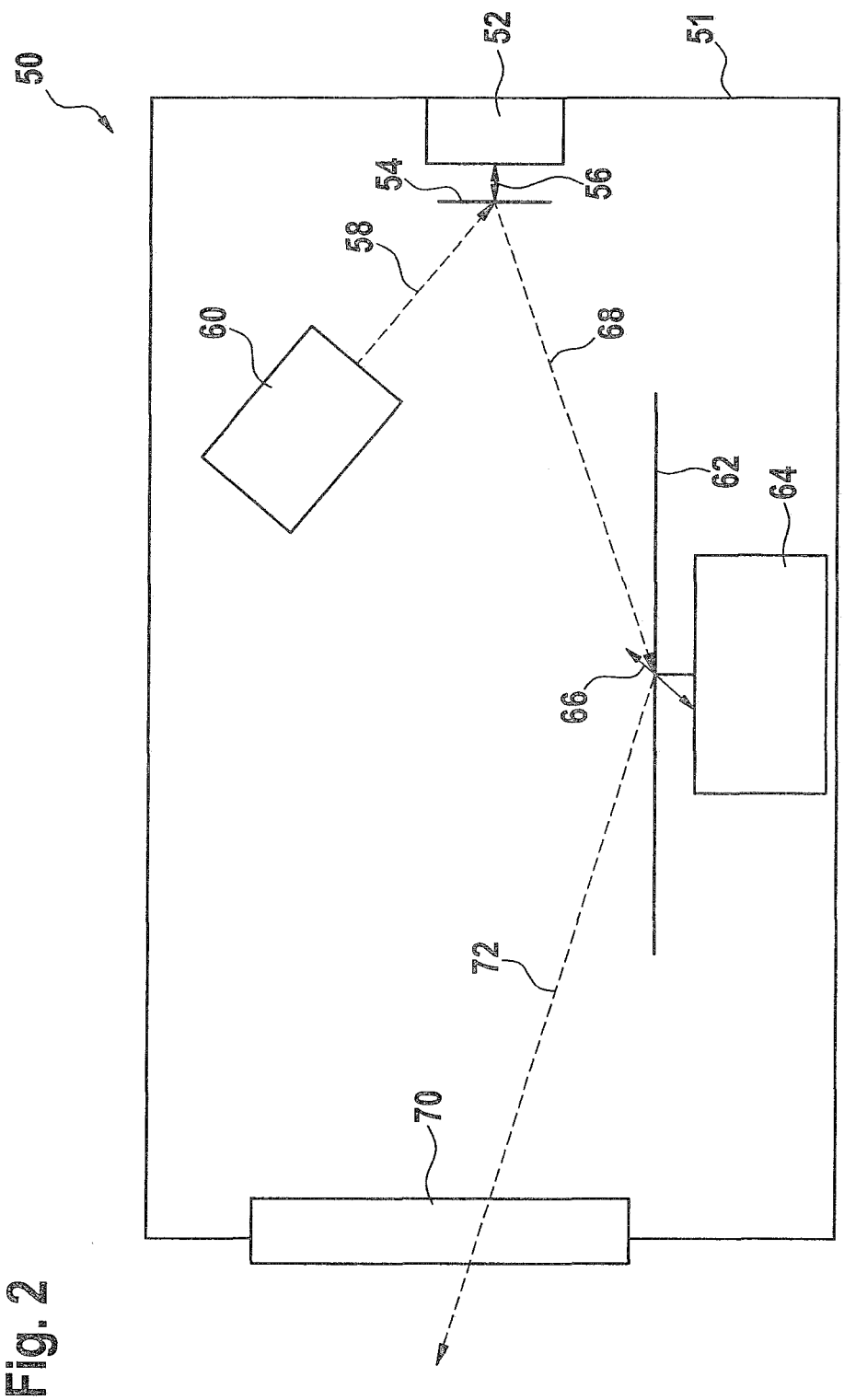
FIG. 2 shows a schematic illustration of one example embodiment of the light-deflecting device.

FIG. 2 shows a schematic illustration of one example embodiment of the light-deflecting device.

Light-deflecting device 50 schematically illustrated in FIG. 2 may be, for example, a projector for projecting an image onto a projector surface, and/or a display device. However, light-deflecting device 50 described further below is not limited to a design as a projector and/or display device. For example, light-deflecting device 50 may also be designed as a scanner for scanning a surface to be investigated, and/or as a light signal transmission device.

In its housing 51, light-deflecting device 50 has a micromechanical component 52 corresponding to the specific embodiment in FIGS. 1A and 1B. A reflective surface 54 of micromechanical component 52 may be displaced between the two electrode surfaces of the mirror element (not illustrated) and the counterelectrode (not illustrated) by applying the temporally varying voltage signal. Reflective surface 54 may preferably be displaced in a direction perpendicular to reflective surface 54. This is schematically indicated by arrow 56. Reflective surface 54 may advantageously be set in resonant oscillating motion. A large amplitude of the displacement motion of reflective surface 54 may thus be achieved with a low expenditure of energy.

Micromechanical component 52 is suitable for modulating a phase of a light beam 58 which is directed onto reflective surface 54. Light beam 58 may be a coherent light beam, for example a laser beam. Light-deflecting device 50 may have a light source 60, a laser, for example, in its housing 51 for emitting light beam 58. As an alternative to light source 60, light-deflecting device 50 may have a light entry window through which an incident light beam strikes reflective surface 54.

Light-deflecting device 50 has at least one mirror surface 62 which may be displaced about at least one rotational axis 66 with the aid of an actuator 64. Mirror surface 62 is preferably displaceable about two mutually perpendicular rotational axes with the aid of actuator 64. Actuator 64 may include an electrostatic drive, a magnetic drive, and/or a piezoelectric drive. Light-deflecting device 50 is not limited to a specific design of actuator 64.

Mirror surface 62 is situated with respect to micromechanical component 52 in such a way that light beam 68 which is reflected on reflective surface 54 strikes mirror surface 62. A light beam 72 is directed from mirror surface 62 through a light exit window 70 and onto an intended point of incidence on a projector surface (not illustrated) by displacing mirror 62 about the at least one rotational axis 66. The appearance of speckle in the projected image may be prevented by modulating the phase of light beams 68 and 72, using micromechanical component 52. The use of micromechanical component 52 in light-deflecting device 50 thus represents a reliable option for preventing speckle. In addition, for light-deflecting device 50 described here, a mirror apparatus in which mirror surface 62 is able to carry out at least one rotational motion about at least one rotational axis 66, as well as a vibrational motion of reflective surface 54 that is suitable for modulation, is not necessary. Thus, light-deflecting device 50 may be manufactured in a cost-effective manner.

Figure 3:
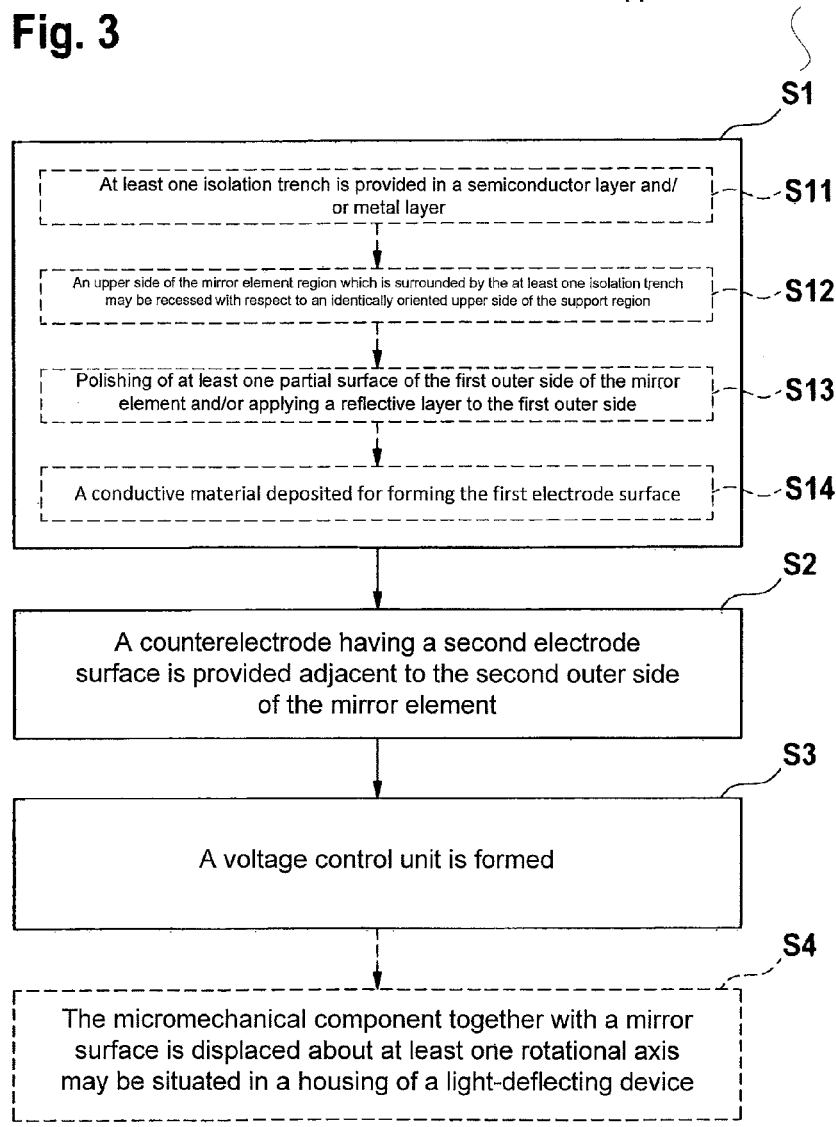
FIG. 3 shows a flow chart for illustrating one example embodiment of the manufacturing method.

FIG. 3 shows a flow chart for illustrating an example embodiment of the manufacturing method.

In a method step S1, a mirror element having a reflective surface is provided on a first outer side of the mirror element. In addition, a first electrode surface is provided on a second outer side of the mirror element which faces opposite the first outer side.

Method step S1 may advantageously include substep S11, in which at least one isolation trench is provided in a semiconductor layer and/or metal layer. The at least one isolation trench is provided in such a way that a mirror element region and a support region which at least partially surrounds the mirror element region are structured from the semiconductor layer and/or metal layer. For the structuring, the mirror element region is connected to the support region via at least one diaphragm which at least partially surrounds the mirror element region. A maximum thickness of the at least one diaphragm and/or a span width of the at least one diaphragm from the mirror element region to the support region may be established via the depth and the width of the at least one isolation trench.

The at least one isolation trench may, for example, be etched into the semiconductor layer and/or metal layer. The width and the position of the at least one etched isolation trench may be established by providing a structured protective layer on an upper side of the semiconductor layer and/or metal layer which faces opposite the first outer side. The protective layer may be structured using a lithographic process, for example.

In a further optional substep S12 of method step S1, an upper side of the mirror element region which is surrounded by the at least one isolation trench may be recessed with respect to an identically oriented upper side of the support region. The upper side of the mirror element region which is surrounded by the at least one isolation trench is preferably recessed in a targeted manner by a desired difference that is between 0.5 to 3 μm by oxidation, followed by removal of the oxidized material. In particular, the oxidation of the upper side of the mirror element region may be carried out while the upper side of the support region is covered by a protective layer. Since the support region is not oxidized, the semiconductor layer and/or metal layer in this region retains its original thickness. Thus, after a selective removal of the oxide, a recess of the mirror element region with respect to the support region remains which establishes the subsequent distance between the two electrode surfaces.

Method step S1 may also include polishing of at least one partial surface of the first outer side of the mirror element and/or applying a reflective layer to the first outer side in a substep S13.

If the semiconductor layer and/or metal layer is made of a nonconductive material, in an optional substep S14 of method step S1 a conductive material may be deposited for forming the first electrode surface. Carrying out substeps S11 through S14 is not limited to the sequence specified by the numbering.

In a further method step S2, a counterelectrode having a second electrode surface is provided adjacent to the second outer side of the mirror element. The counterelectrode is preferably provided adjacent to the second outer side of the mirror element by bonding the counterelectrode to a partial surface of the support region. This ensures that the second electrode surface is situated opposite from the first electrode surface. The second electrode surface may thus be easily situated at an advantageously small distance from the first electrode surface.

A voltage control unit is formed in a method step S3. The voltage control unit is connected to the first electrode surface of the mirror element via a first contact element. In addition, the voltage control unit is connected to the second electrode surface of the counterelectrode via a second contact element. The voltage control unit is formed in such a way that during operation of the finished manufactured micromechanical component a temporally varying voltage signal is applied between the first electrode surface and the second electrode surface. In one preferred specific embodiment, the voltage control unit is designed in such a way that an alternating voltage having a frequency in a range between 100 kHz and 1 GHz, in particular between 1 MHz and 100 MHz, may be applied as a temporally varying voltage signal between the electrode surfaces, using the voltage control unit. Method step S3 may be carried out in any given sequence of method steps S1 and S2 described above.

In an optional method step S4, the micromechanical component together with a mirror surface which may be displaced about at least one rotational axis may be situated in a housing of a light-deflecting device. The micromechanical component and the light-deflecting device are situated with respect to one another in such a way that a light beam reflected on the reflective surface of the micromechanical component strikes the mirror surface. The micromechanical component manufactured in method steps S1 through S3 may have a comparatively small size. Method step S4 may thus be easily carried out.

What is claimed is:

1. A micromechanical component, comprising:
a mirror element having a reflective surface on a first outer side of the mirror element, wherein a first potential is applied to a first electrode surface on a second outer side of the mirror element facing opposite from the first outer side;
a counterelectrode situated adjacent to the second outer side of the mirror element, wherein a second potential is applied to a second electrode surface of the counterelectrode; and
a voltage control unit coupled to the first electrode surface of the mirror element via a first contact element, and to the second electrode surface of the counterelectrode via a second contact element, wherein the voltage control unit is configured to apply a temporally varying voltage signal between the first electrode surface and the second electrode surface such that no temporally constant phase difference is present between spherical waves emanating from individual points of the surface of the mirror element.

2. The micromechanical component as recited in claim 1, wherein the mirror element is configured to be displaced with respect to the counterelectrode, in a direction perpendicular to the reflective surface, by the temporally varying voltage signal applied between the first electrode surface and the second electrode surface.

3. The micromechanical component as recited in claim 1, wherein the mirror element is configured to be set in resonant oscillating motion with respect to the counterelectrode by the temporally varying voltage signal applied between the first electrode surface and the second electrode surface.

4. The micromechanical component as recited in claim 2, wherein the mirror element is a plate electrode having at least one of a polish and a reflective coating as the reflective surface on the first outer side.

5. The micromechanical component as recited in claim 2, wherein the mirror element is connected to a support via at least one diaphragm at least partially surrounding the mirror element.

6. The micromechanical component as recited in claim 5, wherein the counterelectrode is bonded to the support in such a way that the second electrode surface is situated opposite from the first electrode surface.

7. The micromechanical component as recited in claim 2, wherein the voltage control unit is configured to apply an alternating voltage having a frequency in a range between 100 kHz and 1 GHz as the temporally varying voltage signal between the first electrode surface and the second electrode surface.

8. A light-deflecting device, comprising:
a micromechanical component including:
a mirror element having a reflective surface on a first outer side of the mirror element, wherein a first potential is applied to a first electrode surface on a second outer side of the mirror element facing opposite from the first outer side;
a counterelectrode situated adjacent to the second outer side of the mirror element wherein a second potential is applied to a second electrode surface of the counterelectrode; and
a voltage control unit coupled to the first electrode surface of the mirror element via a first contact element, and to the second electrode surface of the counterelectrode via a second contact element, wherein the voltage control unit is configured to apply a temporally varying voltage signal between the first electrode surface and the second electrode surface such that no temporally constant phase difference is present between spherical waves emanating from individual points of the surface of the mirror element; and
a mirror surface configured to be displaced about at least one rotational axis, wherein the mirror surface is situated in such a way that a light beam reflected on the reflective surface of the micromechanical component strikes the mirror surface.

9. A manufacturing method for a micromechanical component, comprising:
forming a mirror element having a reflective surface on a first outer side of the mirror element, a first electrode surface being formed on a second outer side of the mirror element which faces opposite the first outer side;
placing a counterelectrode adjacent to the second outer side of the mirror element, the counter electrode having a second electrode surface; and
forming a voltage control unit and coupling the voltage control unit to the first electrode surface of the mirror element via a first contact element, and coupling the voltage control unit to the second electrode surface of the counterelectrode via a second contact element, the voltage control unit being configured to apply, during operation of the micromechanical component, a temporally varying voltage signal between the first electrode surface and the second electrode surface such that no temporally constant phase difference is present between spherical waves emanating from individual points of the surface of the mirror element.

10. The manufacturing method as recited in claim 9, wherein the forming of the mirror element includes:
forming at least one isolation trench in at least one of a semiconductor layer and a metal layer in such a way that a mirror element region and a support region which at least partially surrounds the mirror element region are structured from the at least one of the semiconductor layer and the metal layer, and the mirror element region being connected to the support region via at least one diaphragm which at least partially surrounds the mirror element region.

11. The manufacturing method as recited in claim 10, wherein for placing the counterelectrode adjacent to the second outer side of the mirror element, the counterelectrode is bonded to the support region in such a way that the second electrode surface is situated opposite from the first electrode surface.

12. A manufacturing method for a light-deflecting device, comprising:
manufacturing a micromechanical component by:
forming a mirror element having a reflective surface on a first outer side of the mirror element, a first electrode surface being formed on a second outer side of the mirror element which faces opposite the first outer side;
placing a counterelectrode adjacent to the second outer side of the mirror element, the counter electrode having a second electrode surface; and
forming a voltage control unit and coupling the voltage control unit to the first electrode surface of the mirror element via a first contact element, and coupling the voltage control unit to the second electrode surface of the counterelectrode via a second contact element, the voltage control unit being configured to apply, during operation of the micromechanical component, a temporally varying voltage signal between the first electrode surface and the second electrode surface such that no temporally constant phase difference is present between spherical waves emanating from individual points of the surface of the mirror element;
placing the micromechanical component in a housing of the light-deflecting device; and
placing a mirror surface in the housing of the light-deflecting device in such a way that a light beam reflected on the reflective surface of the micromechanical component strikes the mirror surface, wherein the mirror surface is configured to be displaced about at least one rotational axis.

* * * * *